United States Patent [19]

Kalenian

[11] Patent Number: 5,505,190
[45] Date of Patent: Apr. 9, 1996

[54] BARBECUE GRILL

[76] Inventor: Paul A. Kalenian, 104 Meriam Rd., Princeton, Mass. 01541

[21] Appl. No.: 391,443

[22] Filed: Feb. 21, 1995

[51] Int. Cl.⁶ .................................................. F24C 3/00
[52] U.S. Cl. ...................... 126/41 R; 126/25 R; 126/80
[58] Field of Search ............................... 126/41 R, 25 R, 126/80, 299 F

[56] References Cited

U.S. PATENT DOCUMENTS

| | | |
|---|---|---|
| 1,925,303 | 9/1933 | Church . |
| 3,051,100 | 8/1962 | Singleton . |
| 3,490,466 | 1/1970 | Warnock . |
| 3,567,399 | 3/1971 | Altman et al. . |
| 3,592,614 | 7/1971 | Schmidt . |
| 3,682,599 | 8/1972 | Hewitt . |
| 3,688,758 | 9/1972 | Stephen, Jr. . |
| 3,868,942 | 3/1975 | Lewis . |
| 4,076,008 | 2/1978 | Deaton . |
| 5,176,124 | 1/1993 | Wrasse ................................ 126/25 R |
| 5,226,407 | 7/1993 | Kalenian ............................. 126/41 R |
| 5,357,940 | 10/1994 | Kalenian ............................. 126/41 R |

*Primary Examiner*—Larry Jones
*Attorney, Agent, or Firm*—Shlesinger Arkwright & Garvey

[57] ABSTRACT

A domestic barbecue grill is shown that has an exhaust manifold and smokestack in combination therewith that is operative to eliminate visible smoke particles and other combustible pollutants in the exhaust gasses that might otherwise flow freely from the smokestack. The device is operative to substantially burn up within the manifold all the visible smoke particles and other pollutants that flow from the cooking process taking place within the grill. The apparatus is operative to convert these emissions from the grill into invisible gaseous compounds before all of the exhaust gasses are discharged from the smokestack into the atmosphere.

8 Claims, 4 Drawing Sheets

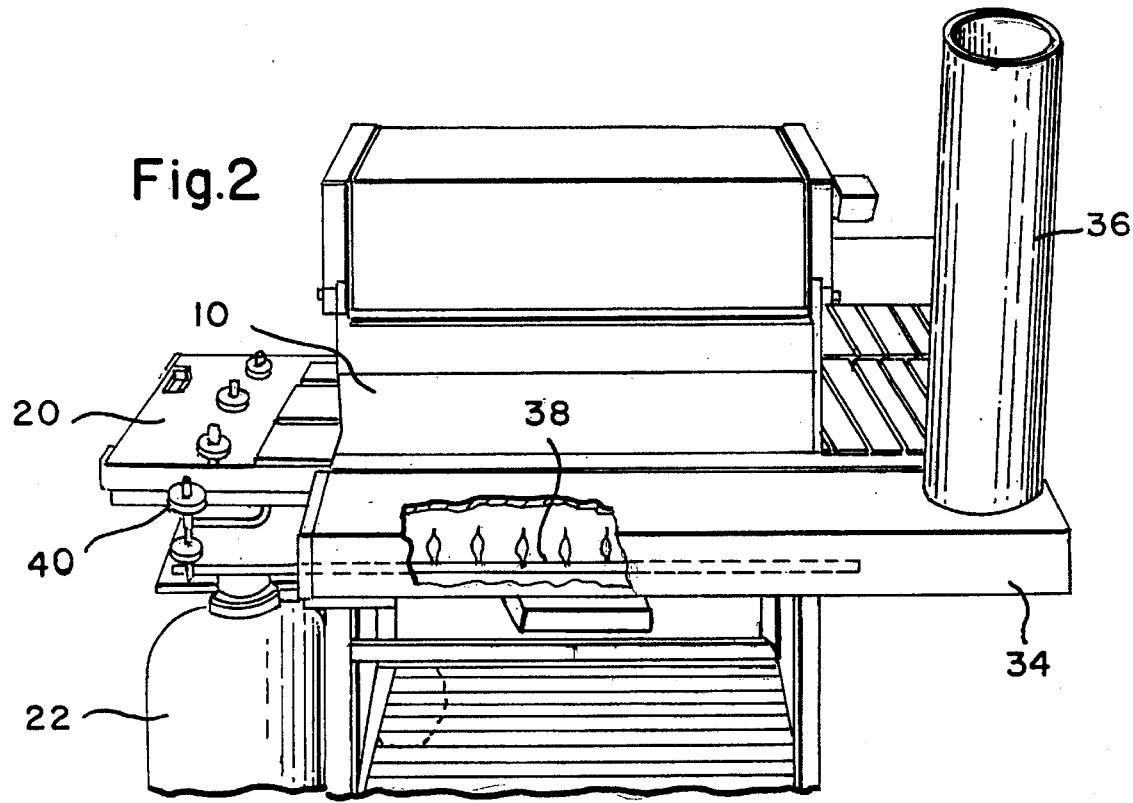
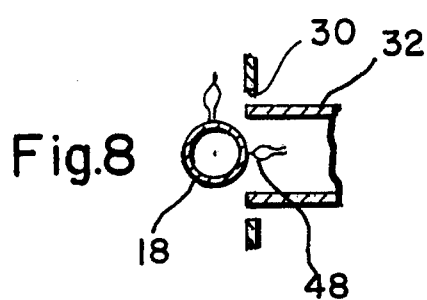

BARBECUE GRILL

This invention relates to a domestic barbecue grill structure and more particularly to such a structure that includes means to eliminate the visible smoke pollution that is usually produced during the cooking process.

RELATED PATENTS

This invention provides an improvement on my prior invention shown in my issued U.S. Pat. No. 5,226,407 and a divisional application Ser. No. 50,688 filed Apr. 22, 1993 which was abandoned in favor of Continuation application which is now issued U.S. Pat No. 5,357,940.

BACKGROUND

In the interest of eliminating visible smoke emissions from escaping into the surrounding atmosphere from domestic barbecue grills it has been established that such grills may be provided with smokestacks having an afterburner means associated therewith which structure is effective to ignite and burn these solid particles which are a part of the stream of effluent flowing from the cooking process and are the source of the visible pollutants. As these visible smoke particles and other combustible material in the effluent burn, these formerly visible pollutants and other combustible products are converted into invisible gaseous compounds within the emissions that flow from the stack. A known structure and method for accomplishing this desired result is shown in my issued U.S. Pat. Nos. 5,226,402 and 5,357,940.

BRIEF DESCRIPTION OF THIS INVENTION

A more compact and improved gaseous exhaust means forms the subject of this invention in which the gasses containing the combustible pollutants are issued immediately into an exhaust manifold for ignition as soon as such gasses are discharged from the combustion chamber of the grill. The exhaust manifold is positioned adjacent to and extends along the back side of the combustion chamber to receive and conduct the exhaust gasses to the smokestack. The combustion of the solid smoke particles and certain other pollutants within the manifold can thus be substantially completed as the gaseous emissions flow toward the smokestack situated at the end of the manifold whereby to more effectively assure the complete elimination of the visible components in the smokestack emissions.

IN THE DRAWINGS

FIG. 2 is a rear perspective view of the grill shown in FIG. 1 disclosing the exhaust manifold partly broken away that is mounted on the back side of the combustion chamber of the grill;

FIG. 8 is a sectional view of an alternative form of the invention in which a distinct afterburner is dispensed with and a modification of the rear burner and jet opening is made.

DETAILED DESCRIPTION

Figure 1:
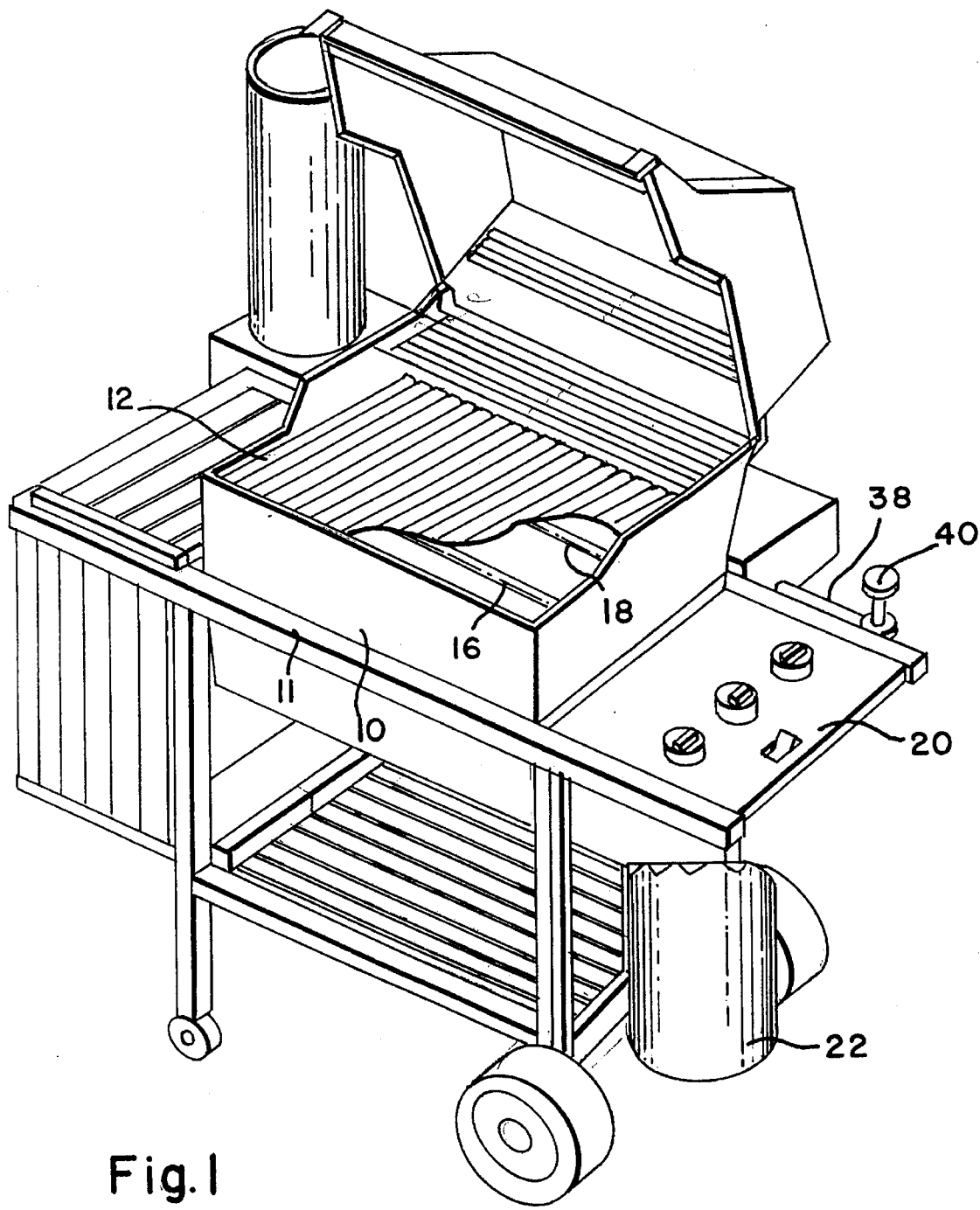
FIG. 1 is a perspective view from the front side of a barbecue grill with the food supporting means partly broken away to expose the combustion chamber.
Figure 3:
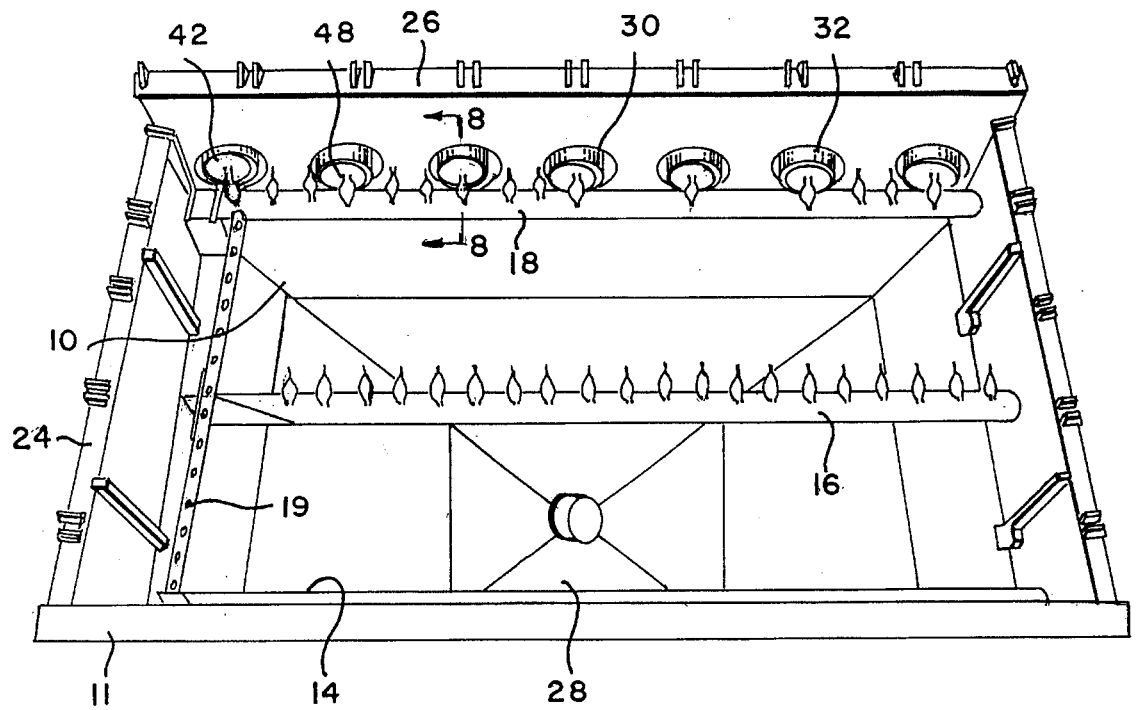
FIG. 3 is a detailed front perspective view of the combustion chamber of the grill of FIG. 1 with the support means for the food that is to be cooked removed.

A typical domestic barbecue grill is shown in FIG. 1 for which this invention is adapted. The grill includes a conventional combustion chamber 10 supported on a stand 11, the chamber having a food support rack 12 carried in the chamber above a gas fired heat source. As seen in FIG. 3 the gas burners 14,16 and 18 extend longitudinally across the entire length of the combustion chamber and are all connected to a cross ignition tube 19 positioned at one end of the burners. The gas flow to these burners is controlled by valves positioned on a table 20 and a tank 22 for holding a supply of gas fuel may be positioned under the table. This burner system maybe provided with any form of an igniter means not shown, which may be built into this unit. Known food support racks are adapted to be mounted over the heat source on the ledge means 24 and 26 and a drip collecting pan 28 is positioned under the burners to complete the combustion chamber assembly.

Figure 4:
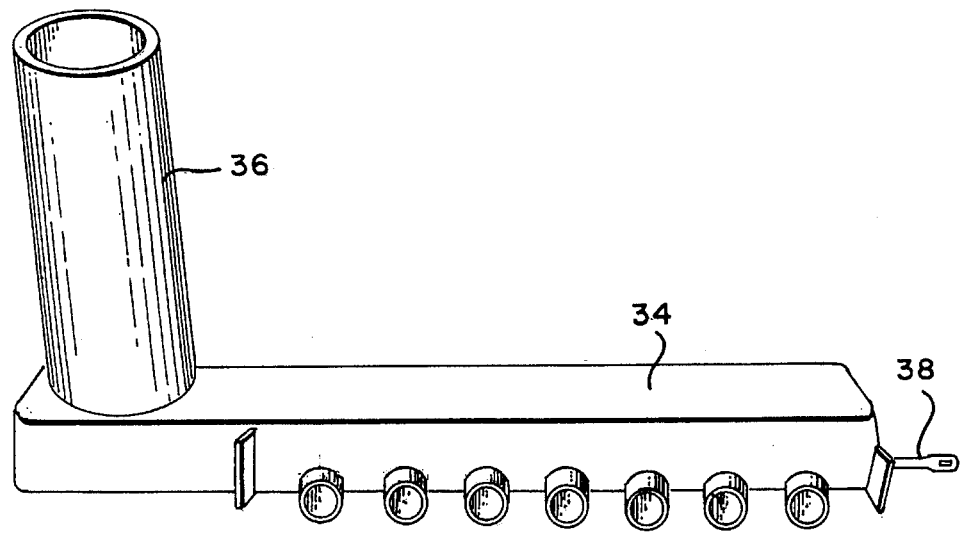
FIG. 4 is a front perspective view of the form of an exhaust manifold means adapted to be mounted on the back wall on the combustion chamber of FIG. 3.
Figure 5:
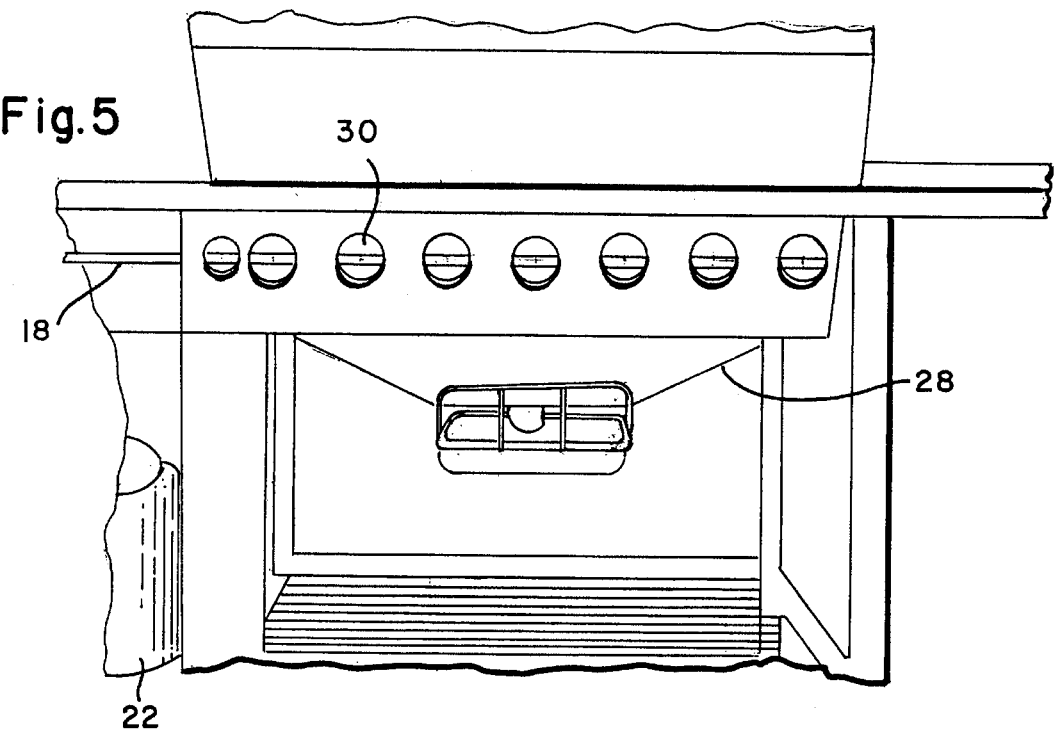
FIG. 5 is an enlarged perspective view of the rear wall of the combustion chamber shown in FIG. 3 showing exhaust apertures for the escape of exhaust gasses from the combustion chamber with the exhaust manifold removed.

When food is being heated on this grill the cooking proceeds in the usual manner and normally a considerable flow of visible smoke is emitted from the food being cooked. When the cover that is shown in the raised position in FIG. 1 is lowered, the gaseous exhaust flow collecting in the combustion chamber is made to exit through the exhaust ports 30 that surround the entrances to the conduits 32 that are disposed centrally of and substantially fill the open area of the ports 30. As shown in FIG. 4 the conduits 32 all are mounted integrally on the front side of the exhaust manifold 34. The manifold as shown in FIG. 2 extends horizontally and lengthwise along the back side of the combustion chamber and the manifold supports the upstanding smokestack 36 located at one end of the manifold.

The manifold is designed to collect all of the gasses that flow from the closed combustion chamber through the conduits 32. Preferably disposed within the manifold and extending longitudinally along its length there is a gas fired after burner 38. When the gas is fed to this after burner by the opening of the valve 40, the gas flowing through the after burner is ignited from the flame that travels along the cross igniter bar 19 which is provided with an extension 42 that passes the flame from the burners in the combustion chamber to the burner of the afterburner in the manifold..

When the hot gasses containing the visible smoke particles and other combustible components flow from the combustion chamber into the manifold and move into the smokestack, a draft is produced that promotes the continued flow of the gasses from the combustion chamber. All of the gas including the solid particles of combustible material that is produced during the cooking process is sucked up into the manifold with the products of combustion from the gas flames and any material that will burn is ignited by the afterburner that extends all the way along the length of the manifold, these combustible products being burned and converted into invisible gaseous compounds as the mixture of these gasses flows toward the stack.

Figure 6:
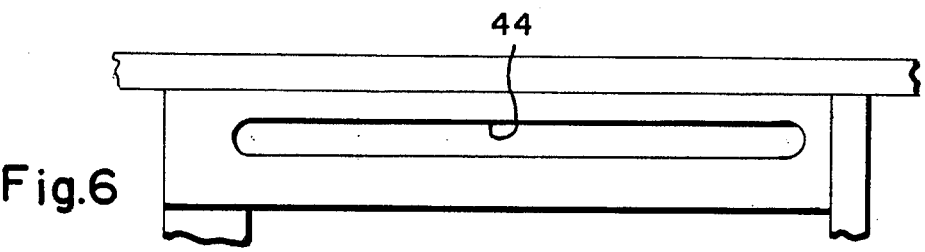
FIG. 6 Is a view similar to that of FIG. 5 in still more detail showing an alternate form of an exhaust aperture for the escape of exhaust gasses from the combustion chamber to the exhaust manifold.
Figure 7:
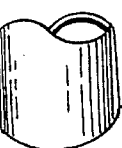
FIG. 7 is a front perspective view of an exhaust manifold for use with the form of the combustion chamber structure shown in FIG. 6.

The provision of the outlet ports 30 and the use of the conduit means 32 produces a sturdy structural arrangement for the back wall of the combustion chamber. An alternate form of an outlet means is shown in FIG. 6 wherein the apertures 30 along the back wall of the combustion chamber are replaced with an elongated slot 44. The manifold shown in FIG. 7 is provided with an entrance conduit 46 that is shaped and sized to just neatly interfit with the slot 44 to direct the gasses that are drawn from the combustion chamber into this alternate form of the exhaust means.

In another form of the invention, as shown in FIG. 8, the afterburner may be dispensed with and the rear burner 18 in the combustion chamber may be provided with a number of jet openings along its back side that face into the mouths of the conduits 30 or the mouth of the conduit 46. When the gas is turned on in the burner system and exhaust gasses are flowing from the combustion chamber into the open mouth of the conduit means, the gas flowing from these rearwardly facing jet openings is ignited to produce the jets of flame 48 that serve to ignite the unburned combustible compounds entrained with the exhaust flow as the exhaust flow enters the manifold. The resulting burning action thus established serves to convert the visible solid components in these gasses into invisible gasses and the other combustible pollutants in the exhaust stream are rendered innocuous as the exhaust flow moves toward and up the smokestack.

In the structure described above a gas fired combustion chamber is shown. Other forms of combustion or heating means may be provided with other types of domestic barbecue grills and it is suggested that with suitable modifications, the advantages of this invention can be realized with the use of the manifold and smokestack combination of this invention. The herein disclosed manifold and smokestack combination means for eliminating unwanted pollutants from the emissions from the grill is equally useful with charcoal fired or electrically heated domestic barbecue grills wherein the hot exhaust gasses containing the objectionable visible and other pollutants are immediately directed into the exhaust manifold and are instantaneously put in contact with an afterburner means associated with the manifold to ignite the combustile components of the gasses that are flowing toward and out of the smokestack. As these unwanted emissions progress to the exit from the stack, the combustion action that takes place in the manifold and possibly continues into the stack converts all of these unwanted pollutants into invisible gasses.

The several modifications of this invention and their operation have now been described in the specification set forth above. It is possible however that other modifications thereof may be made that will fall within the scope of the following claims.

I claim:

1. A barbecue grill and smokestack combination adapted to eliminate smoke emissions from flowing out of the smokestack comprising a rectangular combustion chamber having a front and back and end walls; said front and back walls being longer than said end walls; heat producing means enclosed within said combustion chamber that are provided to cook the food on the grill, said heat producing means generating a hot combustion gas flow during the cooking process that includes combustible visible and invisible pollutants; an exhaust manifold adjacent to and extending lengthwise along said back side wall of said combustion chamber; said smokestack extending substantially vertically from one end of said manifold; an exhaust conduit means connecting the combustion chamber with said manifold for delivering said hot combustion gas flow into said manifold; means to produce an open flame adjacent said conduit means; said combination functioning to establish a flow of said hot combustion gasses into said manifold and smokestack where said pollutants are ignited to burn and be converted into invisible gaseous emissions.

2. The combination as set forth in claim 1 wherein said back wall is constructed with apertures and said exhaust conduit means takes the form of a plurality of tubular passageways integral with said manifold that extend through said apertures in said back wall to interconnect said combustion chamber and said exhaust manifold.

3. The combination as set forth in claim 2 wherein said heat producing means within said combustion chamber includes a gas burner means extending longitudinally along the full length said back wall of said chamber and said burner means having jet openings diposed along its back side for projecting a gas flow into said tubular passageways that interconnect said combustion chamber and said manifold.

4. The combination as set forth in claim 1 wherein said back wall is constructed with an elongated horizontally extending slot, and said exhaust conduit being a horizontally extending elongated passageway means integral with said manifold that interfits with said slot to form a passageway for combustion gasses that flow from said combustion chamber into said manifold.

5. The combination as set forth in claim 4 wherein said heat producing means within said combustion chamber includes a gas burner means extending longitudinally along the full length said back wall of said chamber and said burner means having jet openings disposed along its back side for projecting gas flames into said elongated passageway that interconnects said combustion chamber and said manifold.

6. The combination as set forth in claim 1 wherein said means to produce said open flame adjacent said exhaust means is a gas burner disposed longitudinally within said manifold.

7. The combination as set forth in claim 6 wherein said heat producing means within said combustion chamber includes a gas burner extending longitudinally along the full length of said back wall of said chamber and said burner means having jet openings along its back side for projecting gas flames into said elongated passage way that interconnects said combustion chamber and said manifold.

8. The combination as set forth in claim 1 wherein said heat producing means within said combustion chamber includes a gas burner means extending longitudinally along the full length of said back wall of said chamber and said burner means having jets for projecting gas flames into said exhaust conduit means adapted to ignite said pollutants.

\* \* \* \* \*